(12) United States Patent  (10) Patent No.: US 7,280,075 B2
Koyama et al.  (45) Date of Patent: Oct. 9, 2007

(54) WIRELESS COMMUNICATION TERMINAL DEVICE

(75) Inventors: Tadashi Koyama, Kanagawa (JP); Koichiro Furumatsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 41 days.

(21) Appl. No.: 11/362,445

(22) Filed: Feb. 24, 2006

(65) Prior Publication Data

US 2006/0192714 A1 Aug. 31, 2006

(30) Foreign Application Priority Data

Feb. 25, 2005 (JP) ............... P.2005-051769

(51) Int. Cl.
*H01Q 1/24* (2006.01)
(52) U.S. Cl. .................... 343/702; 343/841
(58) Field of Classification Search ............ 343/702, 343/841, 700 MS, 872
See application file for complete search history.

(56) References Cited

U.S. PATENT DOCUMENTS 6,281,850 B1 * 8/2001 Klostermann ............... 343/702
6,903,686 B2 * 6/2005 Vance et al. ............ 343/700 MS
6,978,165 B2 * 12/2005 Martinez et al. ........... 455/575.7
7,180,464 B2 * 2/2007 Chiang et al. ............... 343/833

FOREIGN PATENT DOCUMENTS

| JP | 10-163748 | 6/1998 |
|---|---|---|
| JP | 11-312912 | 11/1999 |
| JP | 2000-134020 | 5/2000 |
| JP | 2003-101623 | 4/2003 |

* cited by examiner

*Primary Examiner*—Hoanganh Le
(74) *Attorney, Agent, or Firm*—Hogan & Hartson LLP

(57) ABSTRACT

A wireless communication terminal device has a circuit board with a plurality of electronic components arranged thereon and a conductive shielding case attached to the circuit board so that the shielding case covers the plurality of electronic components. At least one of the electronic components is an antenna. A surface shape of the shielding case is formed in a shape not overlapping the antenna. A non-conductive cover is provided at a position on the circuit board corresponding to an area not overlapping the antenna in the surface shape of the shielding case.

17 Claims, 18 Drawing Sheets

WIRELESS COMMUNICATION TERMINAL DEVICE

CROSS-REFERENCE TO RELATED APPLICATIONS

This application is based upon and claims the benefit of priority from the prior Japanese Patent Applications No. 2005-051769, filed on Feb. 25, 2005, the entire contents of which are incorporated herein by reference.

BACKGROUND OF THE INVENTION

1. Field of the Invention

This invention relates to a wireless communication terminal device such as a cellular phone, especially relates to a wireless communication terminal device with an antenna housed within a housing.

2. Description of the Related Art (First Related Art)

Traditionally, in order to assure the antenna characteristic (such as sensitivity), the antenna of the wireless communication terminal device such as a cellular phone was structured so as to be extended externally from the inside of a housing. Although some space is required, the main part of the antenna is externally exposed so that the internal components had little effect on the antenna. Inversely, the antenna also had little limiting effect on the inside of the housing.

Recently, in the wireless communication terminal device such as the cellular phone, for the purpose of miniaturization and improving portability, in many cases, an internal antenna has been adopted. For example, JP-A-2000-134020 discloses the wireless communication terminal device having an internal antenna serving as a chip antenna formed on a flexible board fixed to a shielding case.

However, in the wireless communication terminal device adopting the internal antenna, if another metallic member exists around the antenna, this metallic member may hinder the wireless communication function of the antenna. Further, if the antenna is incorporated at a position, enabling the hindrance to be avoided, the communication would be large-scaled. This led the first problem that it is difficult to assure the space for arranging the antenna within the housing.

(Second Related Art)

There were some wireless communication terminal devices such as a cellular phone in which a user extends an extendable antenna loaded therein in its longitudinal direction and thereafter starts communication such as a telephone call.

However, such an extendable antenna increases the length of the wireless communication terminal device by the extending degree of the antenna, which was an obstruction against making the wireless communication terminal device compact. In order to obviate such inconvenience, a wireless communication terminal device has been proposed which is provided with an internal antenna in place of the above extendable antenna and so can be maintained in compact state during communication also (For example, see JP-A-2003-101623, JP-A-11-312912, and JP-A-10-163748.).

However, in the wireless communication terminal device provided with the internal antenna, the antenna is arranged in the vicinity of the ground (metallic area communicated with a reference potential) on a circuit board within a housing. This led to the second problem that the antenna gain is deteriorated as compared with the wireless communication terminal device provided with the extendable antenna.

SUMMARY OF THE INVENTION

In view of the first problem, the invention provides a wireless communication terminal device capable of preventing the wireless communication function of an antenna from being hindered and being effectively downsized by assuring the arrangement space of the antenna.

In view of the second problem, the invention also provides a wireless communication terminal device capable of preventing the gain of an internal antenna from being deteriorated.

The invention provides a wireless communication terminal device, having:

a circuit board with a plurality of electronic components arranged thereon; and a conductive shielding case attached to the circuit board so that the shielding case covers the plurality of electronic components, wherein at least one of the electronic components is an antenna, a surface shape of the shielding case is formed in a shape not overlapping the antenna, and a non-conductive cover is provided at a position on the circuit board corresponding to an area overlapping the antenna in the surface shape of the shielding case.

In the wireless communication terminal device, the cover and the shielding case have roof surfaces nearly flush with each other.

In the wireless communication terminal device, a key structure with a plurality of operable keys is arranged outside roof surfaces of the cover and the shielding case in their height direction.

In the wireless communication terminal device, any one of the plurality of keys is oppositely arranged outside the roof surface of the cover in its height direction.

In the wireless communication terminal device, the shielding case has a plurality of ribs or legs.

In the wireless communication terminal device, the shielding case is a molded product of synthetic resin including the ribs, and surfaces extending over the ribs and the rib are plated.

In the wireless communication terminal device, the roof surfaces of the shielding case is formed from a metallic plate member, and the ribs of the shielding case is formed from a synthetic resin member.

In the wireless communication terminal device, the cover has a rib or a leg so that the cover enables to support depressing force applied on a roof surface of the cover when a key is operated.

In the wireless communication terminal device, the cover and the shielding case have connection pieces connectable to each other, respectively.

In the wireless communication terminal device, the connection pieces are formed to be connectable by a concave and a convex which are engageable with each other.

In the wireless communication terminal device, the connection pieces are detachable from each other.

According to the wireless communication terminal device, it is possible to prevent the wireless communication function of an antenna from being hindered, and to be effectively downsized by assuring the arrangement space of the antenna.

The invention provides a wireless communication terminal device, having:

a first circuit board on which a first antenna and an electronic component are arranged;

a conductive shielding case formed on the first circuit board so as to cover the electronic component, and formed in a shape recessed in an area overlapping the first antenna and the first circuit board in a thickness direction thereof;

a non-conductive cover which adjoins the shielding case on the first circuit board, and is located at a position overlapping the first antenna in the thickness direction of the first circuit board;

a second circuit board which has a plurality of key switches and a conductive area electrically connecting the plurality of key switches to the first circuit board, and is placed on the shielding case and cover, wherein the conductive area is formed at a spot not overlapping the first antenna in the thickness direction of the first circuit board; and a housing which incorporates the first circuit board, the shielding case, the cover, and the second circuit board.

The wireless communication terminal device, further has:

a key sheet which is overlaid on the second circuit board, and has a plurality of keys capable of depressing the plurality of key switches, respectively, wherein the housing has a plurality of key slots from which each depressed face of the plurality of keys externally exposes, and the first antenna is arranged at a position not overlapping the key slots in the thickness direction of the first circuit board at an end of a width direction and/or a longitudinal direction of the first circuit board.

In the wireless communication terminal device, the second circuit board has a reference potential pattern to be supplied with a reference potential in the conductive area.

In the wireless communication terminal device, the first circuit board has a reference potential pattern supplied with a reference potential for the first circuit board, and the reference potential pattern is located at a position not overlapping the first antenna in the thickness direction of the first circuit board.

In wireless communication terminal device, the housing incorporates a second antenna supplied with power from the first circuit board, and the reference potential pattern of the first circuit board is arranged at a position not overlapping the second antenna in the thickness direction of the first circuit board.

In wireless communication terminal device, the second antenna is at a position not overlapping the shielding case in the thickness direction of the first circuit board.

According to the wireless communication terminal device, it is possible to prevent the gain of the internal antenna from being deteriorated.

BRIEF DESCRIPTION OF THE DRAWINGS

FIG. 3A is a plan view thereof, and FIG. 3B is a side view thereof;

DETAILED DESCRIPTION OF THE PREFERRED EMBODIMENTS

Embodiments of the invention will be explained with reference to the drawings hereinafter.

First Embodiment

FIGS. 1 to 5 are views for explaining a first embodiment of the invention.

Figure 1:
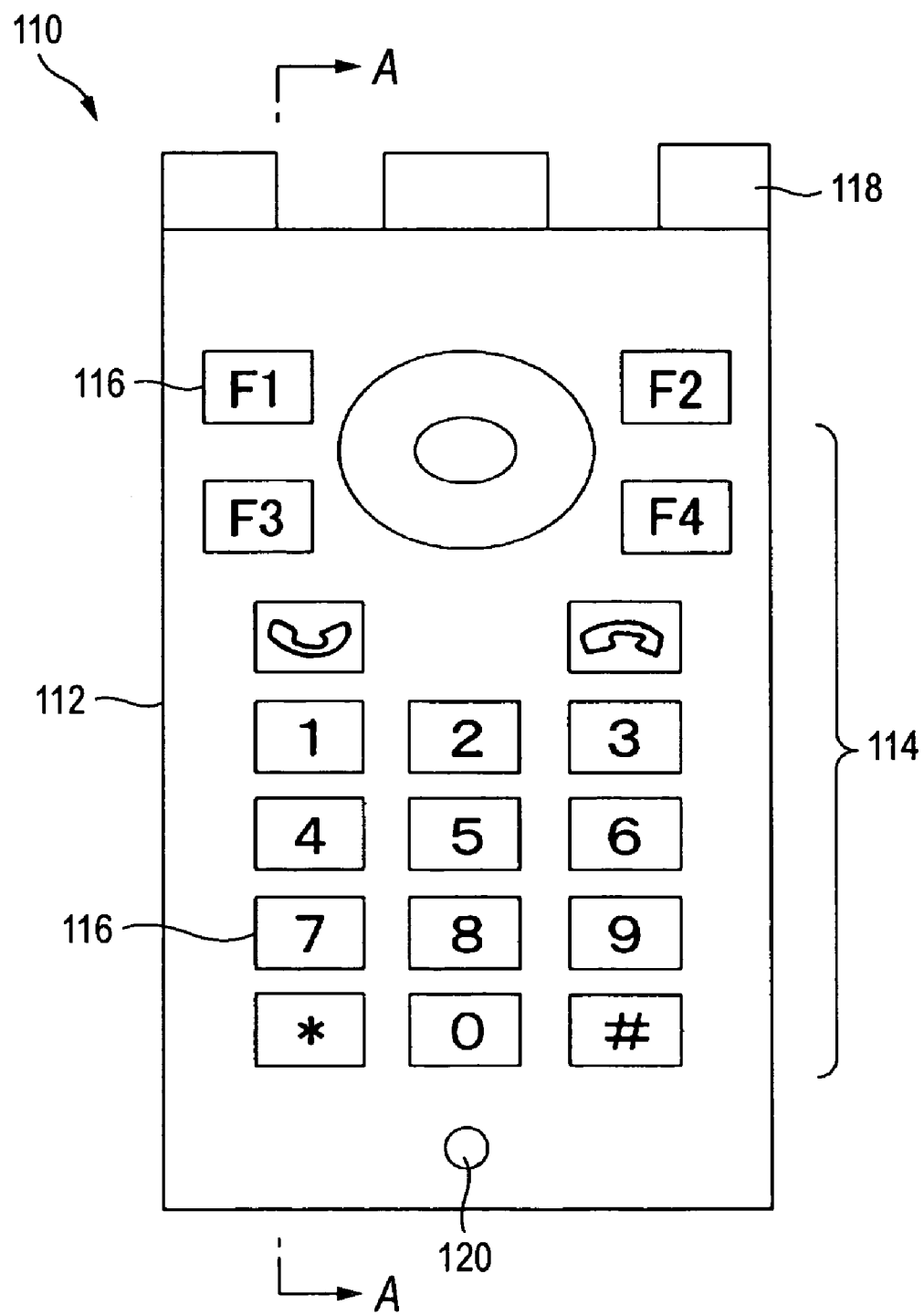
FIG. 1 is a plan view of a housing 12 having an operating unit 114 of a cellular phone 110 according to a first embodiment of this invention.

FIG. 1 is a view showing a housing 112 having an operating unit 114 on which a plurality of keys 116 are operably arranged in a cellular phone (wireless communication terminal device) 110 according to the embodiment. At the upper end shown of the housing 112, a hinge 118, which is rotatably coupled with the hinge attached to another housing (not shown), is provided. At the lower end shown of the housing 112, a microphone 120, which is employed during speech of a telephone function, is provided.

Figure 2:
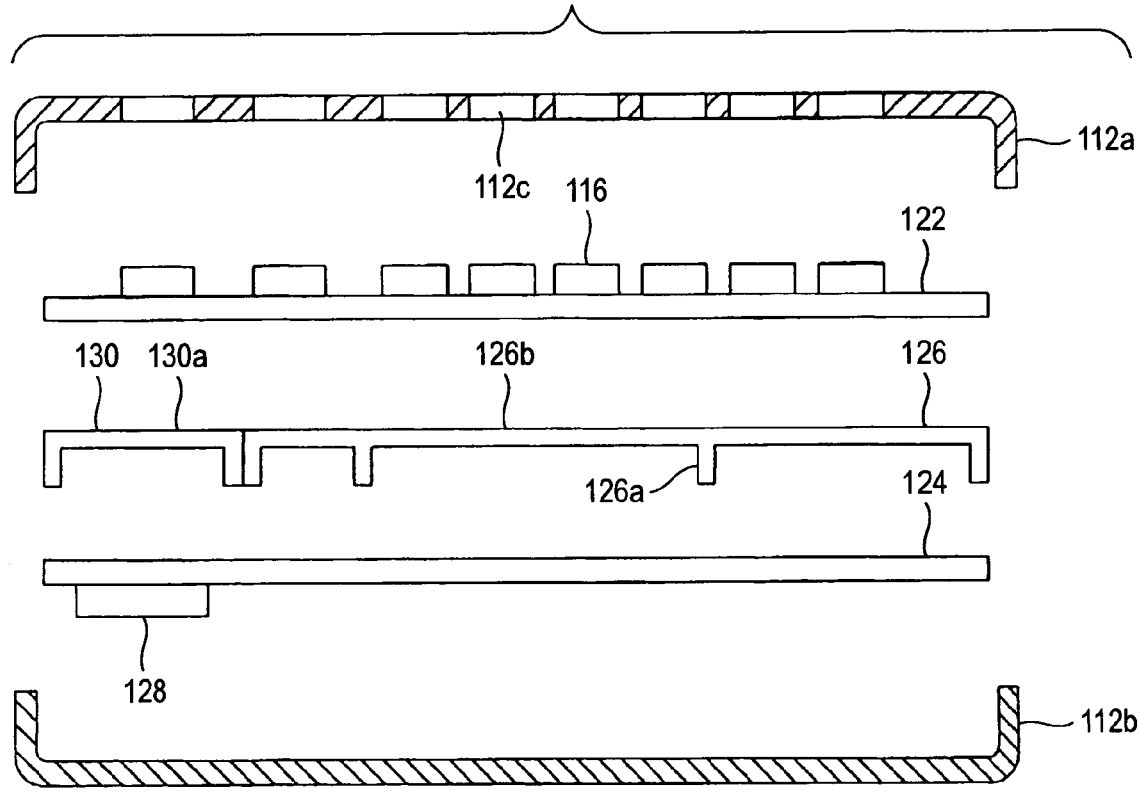
FIG. 2 is an exploded sectional view of the housing 112 taken in line A-A line in FIG. 1.

The housing 112, as seen in FIG. 2, is configured from an upper case 112a and a lower case 112b. Inside the upper case 112a, arranged is a key module 122 (key structure) having switching elements each of which is turned on when one of keys 116 is depressed on a hard plane.

And when the key module 122 is imposed on the upper case 112a, each of the keys 116 is fit in each of key fitting slot 112c formed in the upper case 112a so that its tip is externally exposed.

Between the key module 122 and the lower case 112b, arranged is a circuit board 124 with a plurality of electronic components (not shown) formed on the face on the key module 122 side. Further, on the face on the same side of the circuit board 124, a shielding case 126 having a hard roof surface 126b is formed so as to cover the above plurality of electronic components and form a closed space with the circuit board 124.

Figure 5:
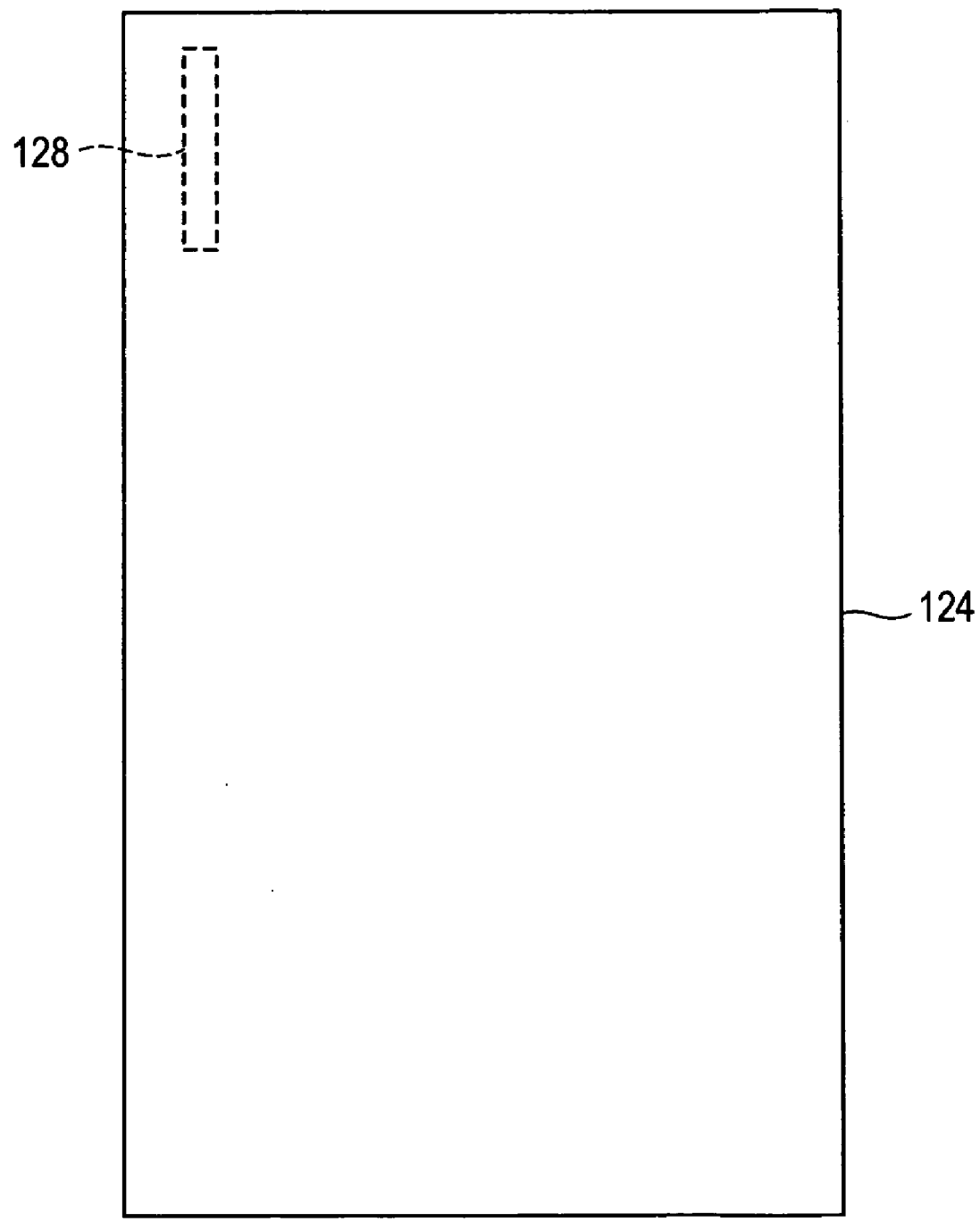
FIG. 5 is a plan view schematically showing a circuit board 124.

As seen in FIG. 2, an antenna chip 128 (antenna unit) is attached to the face on the side opposite to the shielding case 126 of the circuit board 124 at a position as shown in FIG. 5.

The shielding case 126 is made of hard plastic and has a plurality of ribs 126a (legs) formed integrally thereto on the circuit board 124 side. The root surface 126b and ribs 126a of the shielding case 126 is given metallic plating. For this reason, even if the shielding case 126 is slimmed, when the key 116 of the key module 122 above the roof surface 126b is depressed, the shielding case 126 can have strength against the depressing force applied from above. Thus, the shielding case 126 serves as a conductive member.

Figure 3A:
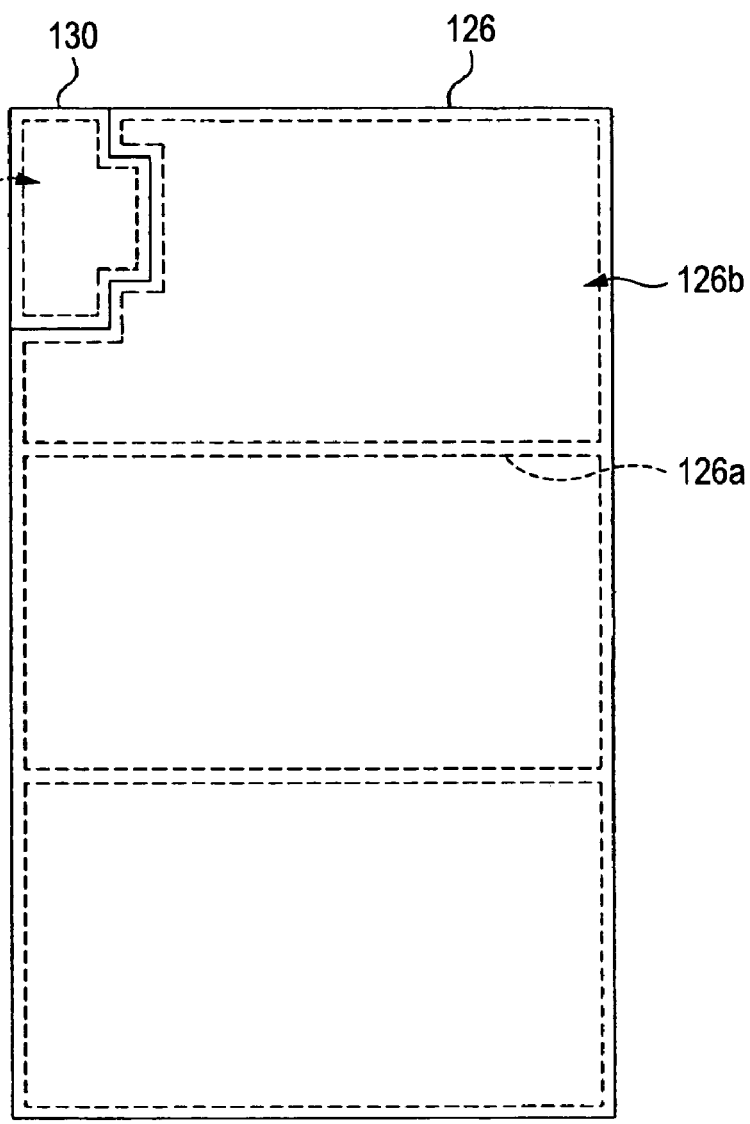
Figure 4:
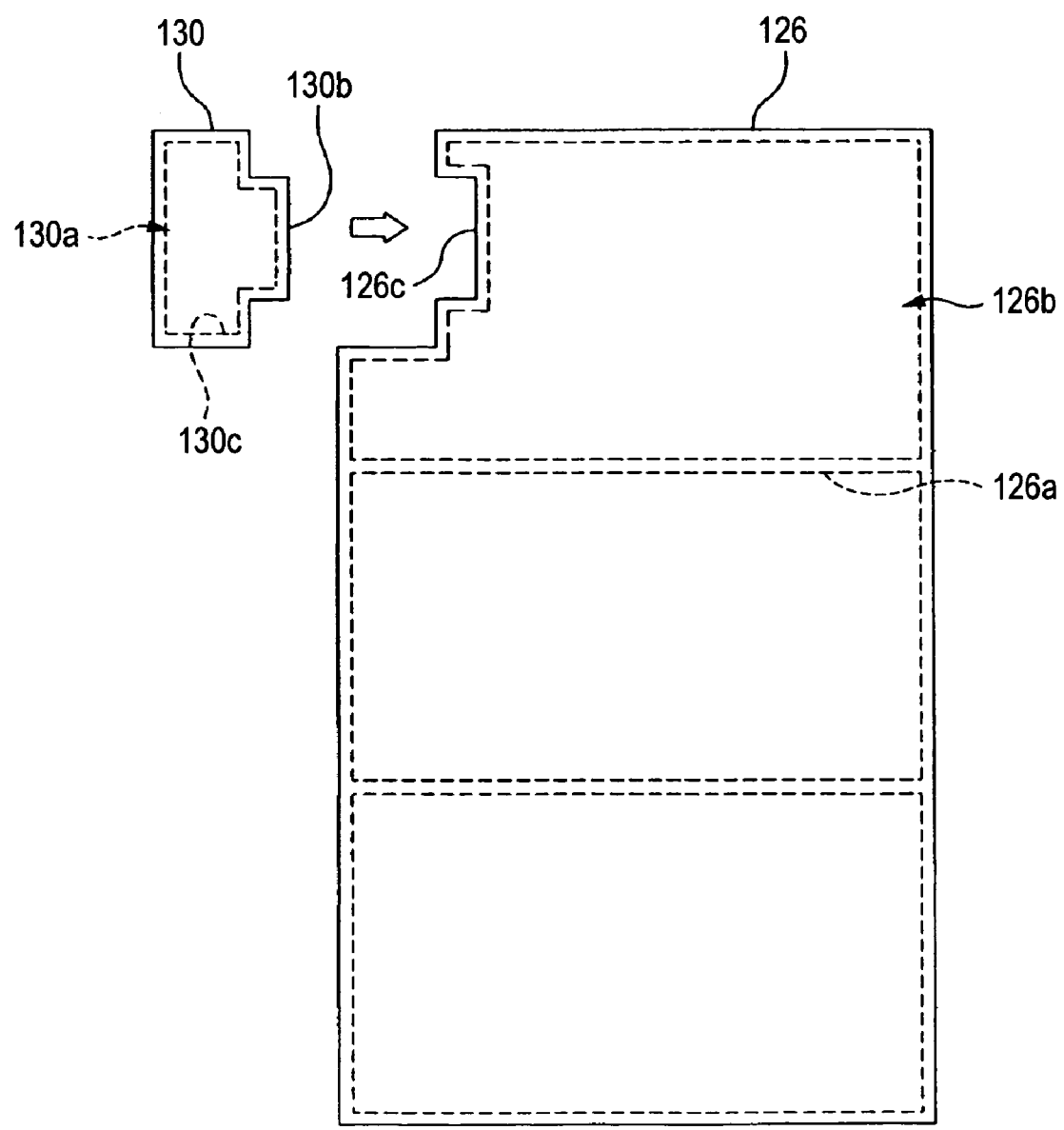
FIG. 4 is an exploded plan view of the shielding case 126 and cover 130.

Further, the shielding case 126, as seen in FIG. 4, is formed in a shape in which the upper left area of the roof surface 126b is recessed. This recessed shape is laid out so that a cover 130 of another member is arranged therein, as seen in FIG. 3A.

In FIG. 2, on the lower case 112b side of the cover 130, the antenna chip 128 attached on the lower case 112b side of the circuit board 124 is located at a position vertically overlapping the cover 130. On the upper case 112a side of the cover 130, the key 116 corresponding to a function key "F1" in FIG. 1 attached to the key module 122 is located at a position vertically overlapping the cover 130.

As seen in FIG. 4, the cover 130 has a convex 130b (connection piece) projected rightward on the right side. The recessed shape in the upper left area of the shielding case 126 has a concave 126c (connection piece) formed so as to open leftward.

When the convex 130b of the cover 130 is fit in the concave 126c of the shielding case 126, the cover 130 is connected to the shielding case 126. And the convex of the cover 130 is detachably connected to the concave 126c of the shielding case 126.

The cover 130 is made of plastic like the shielding case 126, but its roof surface 130a and rib 130c are not given metallic plating unlike the shielding case 126. Thus, the cover 130 serves as a non-conductive member.

Figure 3B:
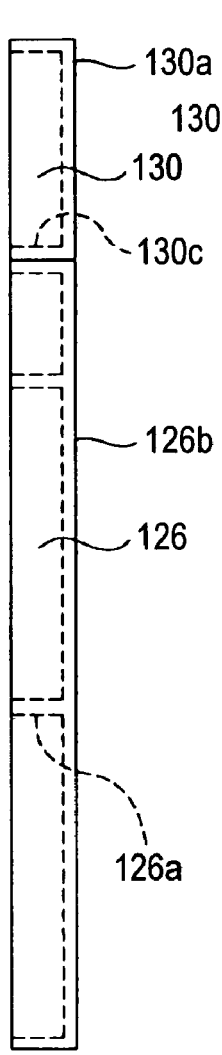
FIGS. 3A and 3B are views of a shielding case 126 and a cover 130.

The cover 130, as seen in FIG. 3B, formed at the same height as the shielding case 126. So, its roof surface 130a is flush with the roof surface 126b of the shielding case 126. The cover 130 also has the rib 130c (leg) formed at the edge, like the shielding case 126, Thus, the cover can have strength against the depressing force applied from above when the key 116 of the key module 122 is depressed.

In accordance with the cellular phone 110 described above, the members above and below the antenna chip 128 are not metallic-plated, and no metallic member is arranged in the vicinity of the antenna chip 128 within the housing 112. In this way, it is possible to prevent the wireless communication function of the antenna chip 128 from being hindered by the metallic plating and metallic member.

Further, the convex 130b of the cover 130 is coupled with the concave 126c of the shielding case 126 by fitting and the roof surface 130a and rib 130c of the cover 130 are not given metallic plating. In this manner, the antenna chip 128 can be arranged within the housing 112 so that the arrangement space of the antenna chip 128 can be assured within the housing 112.

As understood from the description hitherto made, in accordance with this invention, it is possible to prevent the wireless communication function of the antenna chip 128 from being hindered, and the arrangement space of the antenna chip 128 can be assured. Thus, the wireless communication terminal device such as the cellular phone 110 can be effectively downsized.

Further, the area corresponding to the antenna chip 128 of the shielding case 126 is recessed and another member or the cover 130 not metallic-plated is arranged in the recessed area. This permits omitting a step of masking which is required in metallic-plating the roof surface 126b of the shielding case 126 if the area corresponding to the antenna chip 128 is not recessed, thereby reducing cost for the metallic plating.

Second Embodiment

Figure 6:
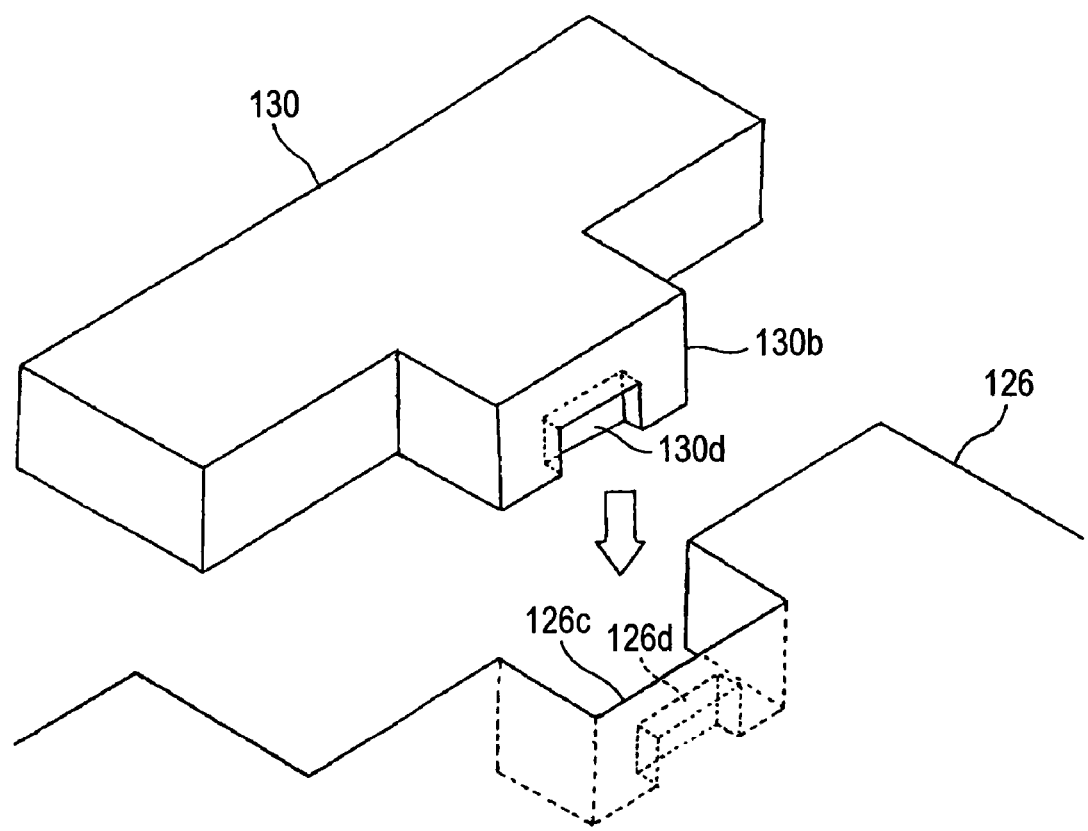
FIG. 6 is a perspective view of the main part of the cover 130 and shielding case 126 of a cellular phone according to a second embodiment of this invention.

FIG. 6 is a view for explaining the second embodiment of the invention. In the first embodiment, the cover 130 is provided with the convex 130b and the shielding case 126 is provided with the concave 126c. And the convex 130b of the cover 130 is only fit in the concave 126c of the shielding case 126. On the other hand, the second embodiment gives an arrangement as shown in FIG. 6.

Specifically, at the lower portion of the tip of the convex 130b of the cover 130, a tiny concave 130d is formed. And at the lower portion of the end face of the concave 126c of the shielding case 126, a tiny convex 126d is formed. Therefore, before the shielding case 126 is imposed on the circuit board 124, the tiny convex 130d of the cover 130 is vertically slid and inserted into the tiny convex 126d of the shielding case 126 so that the former is provisionally fixed to the latter. Thereafter, both the shielding case 126 and cover 130 are imposed on the circuit board 124. Thus, the imposing accuracy of the shielding case 126 and the cover 130 with the circuit board 124 can be improved.

In the first and second embodiments described above, this invention was applied to the cellular phone, but may be applied to the wireless communication terminal device other than the cellular phone, such as a PDA (Personal Digital Assistant)

The entire shielding case 126 was formed of plastic and given metallic plating. However, the shielding case 126 may be used in such a manner that the roof surface 126b of the shielding case 126 is formed of a metallic plate and plastic ribs subjected to metal plating is bonded to the metallic plate.

Third Embodiment

FIGS. 7 to 18 are views for explaining a folding cellular phone 22 (corresponding to a wireless communication terminal device) according to a third embodiment of the invention.

Figure 7:
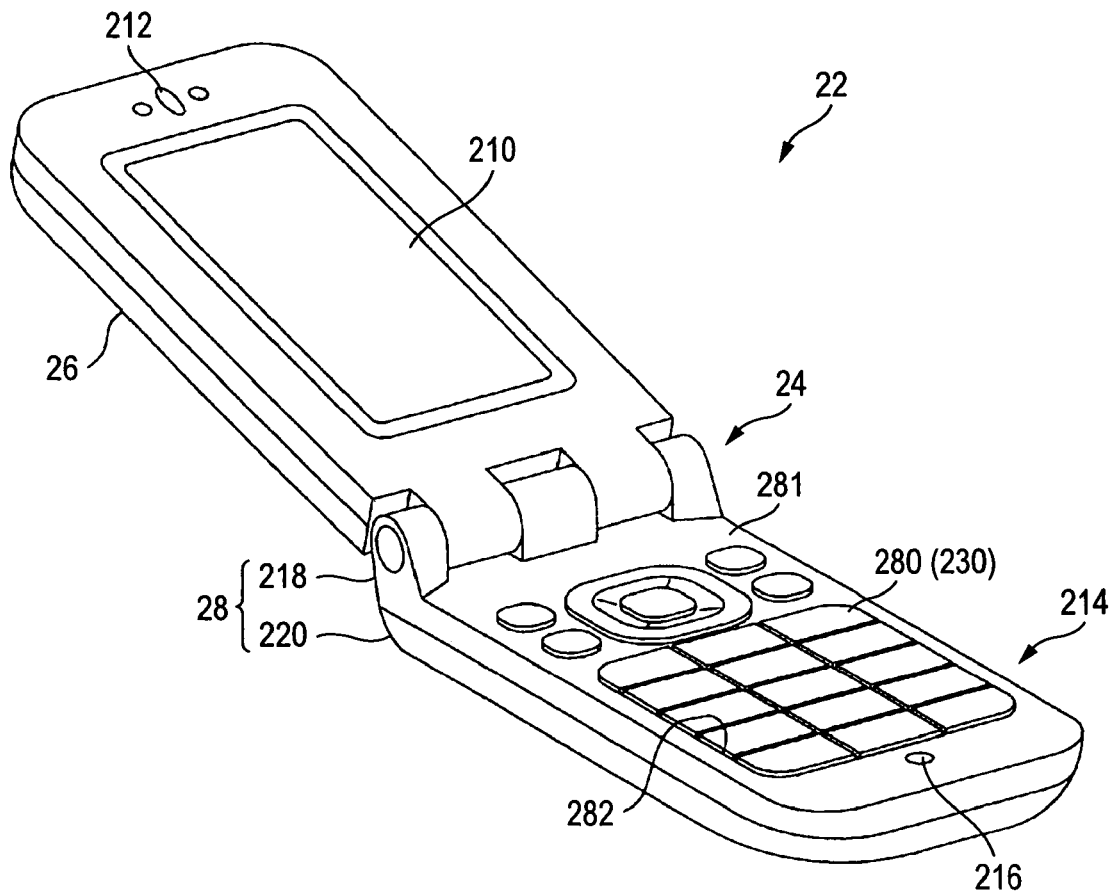
FIG. 7 is a perspective view of a folding cellular phone 22 according to a third embodiment of this invention.

As seen in FIG. 7, the folding cellular phone 22 according to this embodiment is provided with a first housing 26 and a second housing 28 which are rotatably coupled with each other through a hinge 24. The first housing 26 has a display unit 210 and a speaker 212. The second housing 28 has an operating unit 214 and a microphone 216. The microphone 216 is arranged at a position in the vicinity of the end opposite to the hinge 24 in the longitudinal direction of the second housing 28.

Figure 8:
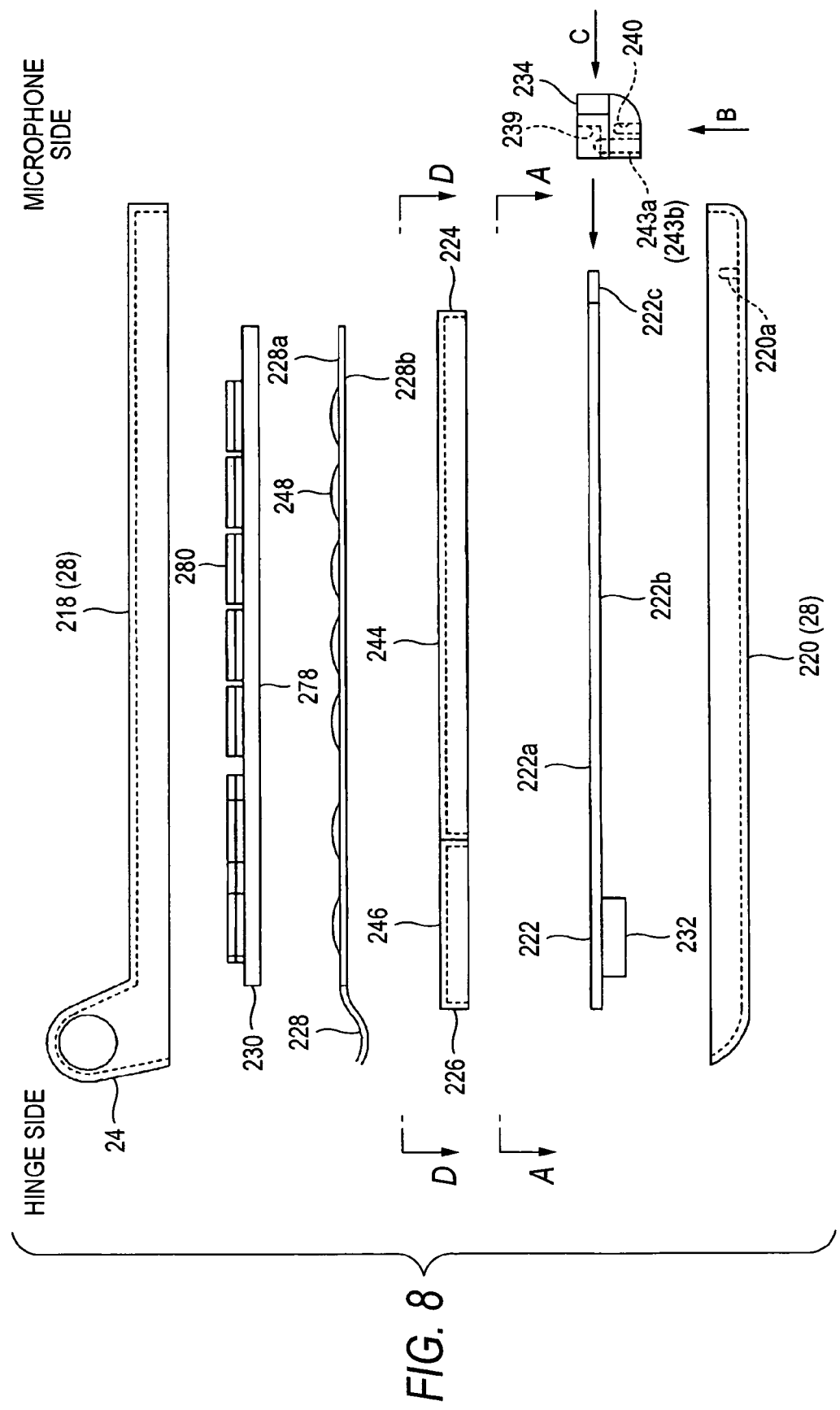
FIG. 8 is an exploded side view showing the state before assembly of an upper case 218 and lower case 220 shown in FIG. 7; and a rigid board 222, a shielding case 224, a cover 226, a key FPC 228, a key structure sheet 230, a first antenna 232 and a second antenna 234, which are housed within the second housing 28.

The second housing 28 consists of an upper case 218 incorporating the operating unit 214 and a lower case 220 on the rear side thereof. As seen in FIG. 8, the internal space formed between the upper case 218 and the lower case 220 houses, in order from the lower case 220 side, a rigid board 222 (corresponding to a first circuit board), a shielding case 224, a cover 226, key FPC (flexible board) 228 (corresponding to a second circuit board) and a key structure sheet 230.

In the rigid board 222, on a first face 222a on the upper case 218 side and on a second face 222b of the lower case 220 side opposite to the first face 222a, various kinds of electronic components (not shown) are arranged. Further, on the second face 222b of the rigid board 222, a first antenna 232 which is the internal antenna is fixed.

Figure 9:
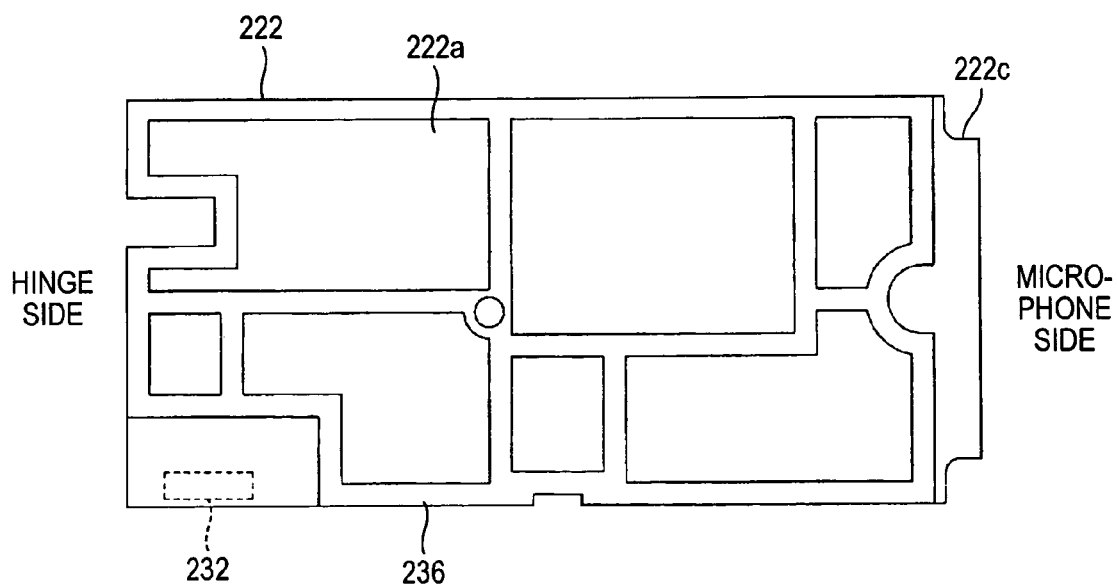
FIG. 9 is a plan view of the rigid board 222 taken in arrow A-A in FIG. 8.

The first antenna 232, as seen in FIG. 9, is arranged at the one end in the width direction of the end on the hinge 24 side in the longitudinal direction of the rigid board 222. On the first face 222a of the rigid board 222, a reference potential pattern 236 communicated with the reference potential is formed at a position not overlapping the first antenna 232 in the thickness direction of the rigid board 222.

Figure 10:
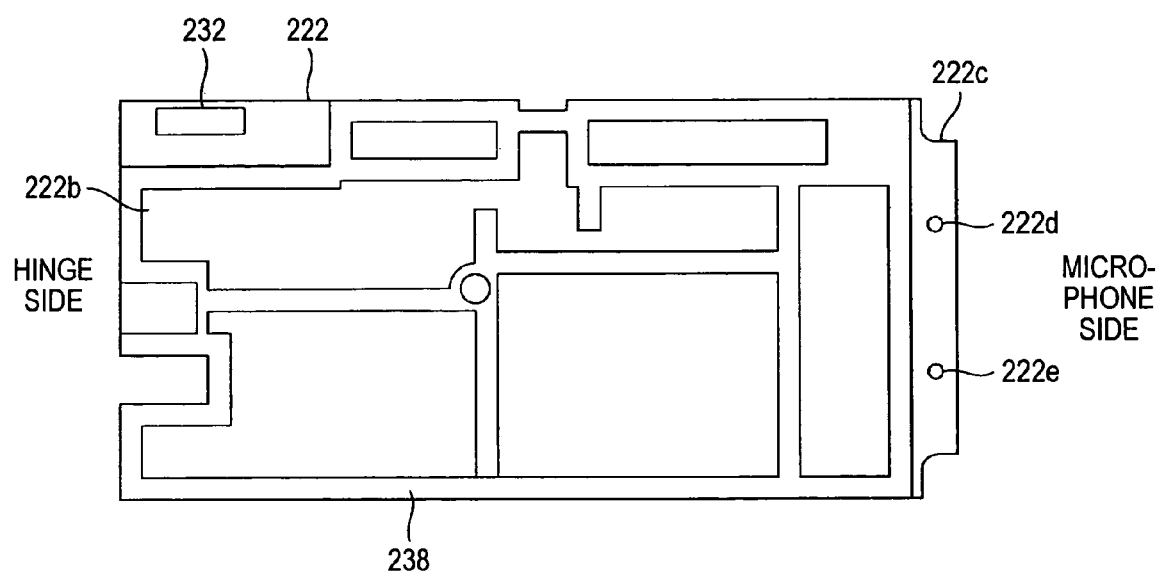
FIG. 10 is a back view of the rigid board 222 shown in FIG. 9.

Further, as seen in FIG. 10, on the second face 222b side also of the rigid board 222 which is the rear side of the first face, a reference potential pattern 238 communicated with the reference potential is formed at a position not overlapping the first antenna 232. The first antenna 232 is circuit-connected to a wiring pattern (not shown) formed on the second face 222b and power-supplied therefrom.

Figure 11:
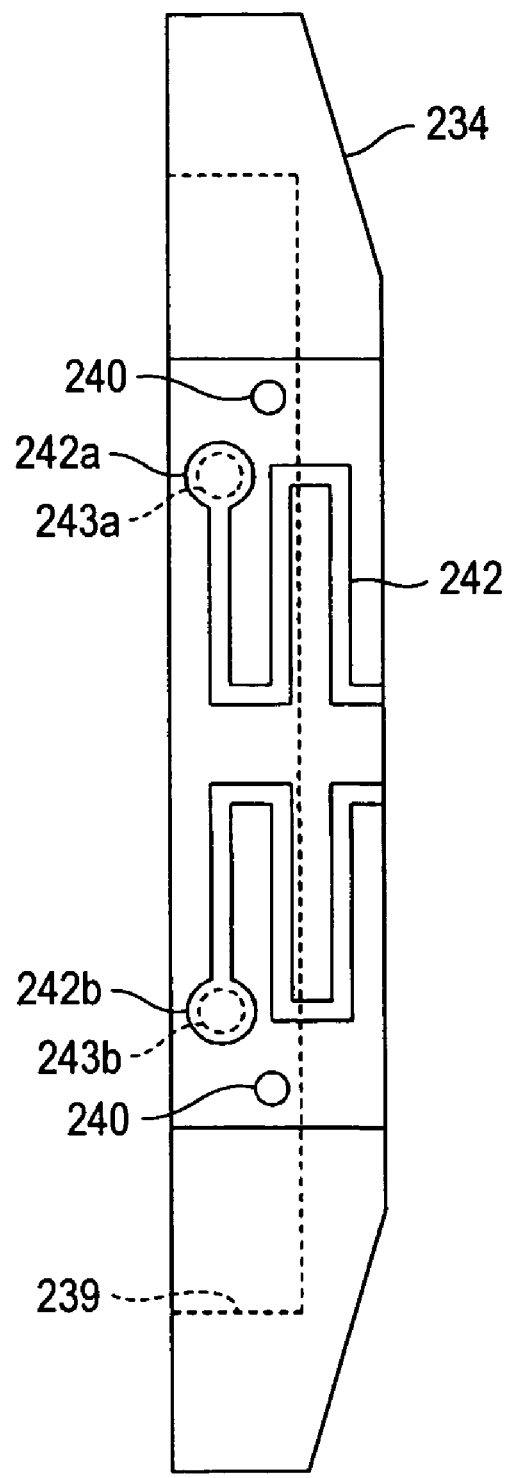
FIG. 11 is a view of the second antenna 234 taken in arrow B in FIG. 8.

Further, as seen in FIG. 8, to the end 222c on the microphone 216 side of the rigid board 222 in the longitudinal direction thereof, a second antenna 234 which is also the internal antenna is to be attached. The second antenna 234, as seen in FIGS. 8 and 11, has an attachment depression 239 formed to hang over the end 222c of the rigid board 222 from the second face 222b side. Thus, the second antenna 234 is built in the rigid board 222 in an overlapping manner so as to wrap the end 222c of the rigid board 222.

Further, the second antenna 234, as seen in FIGS. 8 and 11, has fitting slots 240. These fitting slots 240 are to be fit in projections 220a formed inside the end on the microphone 216 side in the longitudinal direction of the lower case 220.

Figure 12:
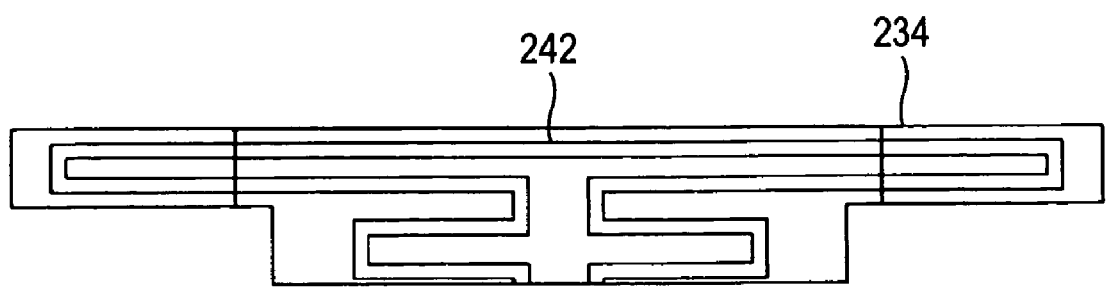
FIG. 12 is a view of the second antenna 234 taken in arrow C in FIG. 8.

The second antenna 234, as seen in FIGS. 11 and 12, has a conductive pattern 242 serving as antenna formed on the surface thereof. The conductive pattern 242 is formed in a shape in which a single path is bent alternately in layers. Both ends 242a, 242b of the conductive pattern 242 as shown in FIG. 11, as seen in FIGS. 8 and 11, are urged by springs (not shown) in the direction perpendicular to the face of the attachment depression 239 being in contact with the second face 222b of the rigid board 222. So the ends 242a, 242b are communicated to pin-like terminals 243a, 243b formed so that their tips project into the attachment depression 239.

When these terminals 243a, 243b, as seen in FIG. 8, are built in the rigid board 222 in an overlapping manner so that the second antenna 234 wraps the end 222c of the rigid board 222, they are brought into electric contact with power supplying terminals 222d, 222e formed on the second face 222b of the rigid board 222 as shown in FIG. 10. In this way, the second antenna 234 can be supplied with power from the rigid board 222.

The folding cellular phone 22 is designed to enable the communication in not only the CDMA (Code Division Multiple Access) system but also the EVDO (Evolution Data Only) system. Where the communication in the EVDO system is carried out, using both the first antenna 232 and the second antenna 234, for example, diversity reception which is one of reception systems is made. Incidentally, if the diversity reception is not required, only the second antenna 234 may be employed.

The first antenna 232 and the second antenna 234 are different in their directivity characteristics and also arranged separately from each other within the second housing 28 as seen in FIG. 8. For this reason, in the diversity reception, the folding cellular phone 22 can adopt a more preferably received signal through either the first antenna 232 or the second antenna 234, or otherwise can compose received signals obtained through both antennas, thereby improving the receiving environment.

Figure 13:
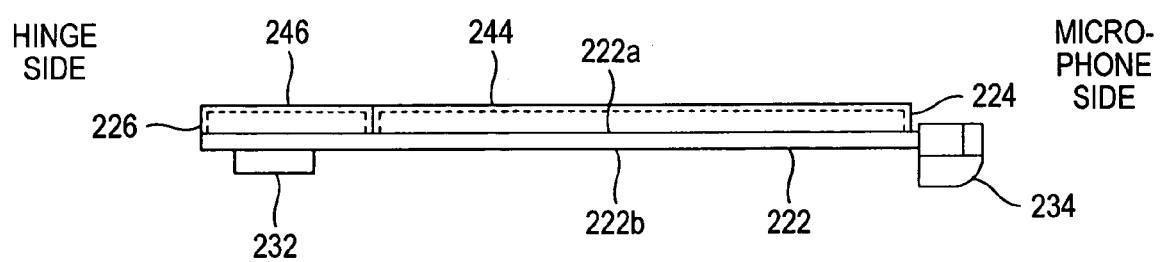
FIG. 13 is a side view showing the state after assembly of the rigid board 222, shielding case 224, cover 226 and second antenna 234, shown in FIG, 8.

Next, as shown in FIG. 13, the shielding case 224 is a box-like body with its bottom opened (rigid board 222 side). The shielding case 224 overlays electronic components such as a high frequency circuit (not shown) on the first face 222a of the rigid board 222 to form a closed space with the first face 222a. The shielding case 224 has a top face 244 which is nearly flat in opposition to the first face 222a of the rigid board 222. The top face 244 is formed to be in parallel to the rigid board 222 in a state where the shielding case 224 is attached to the rigid board 222.

Figure 14:
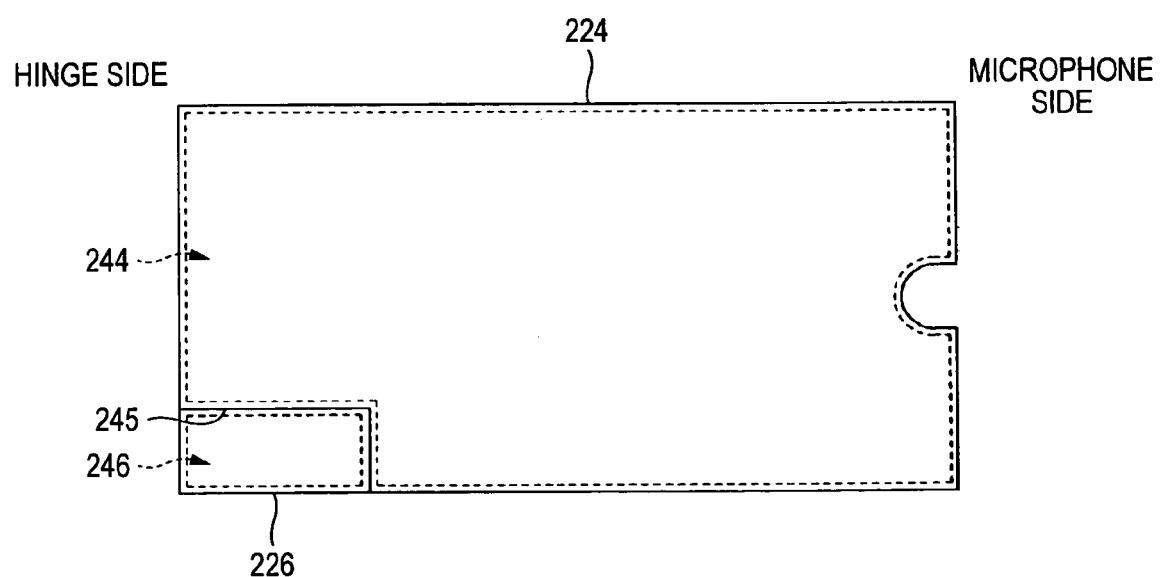
FIG. 14 is a plan view of the shielding case 224 and cover 226 taken in arrow D-D in FIG. 8.

Further, as seen in FIG. 14, the top face 244 of the shielding case 224 is square in its planar shape. In addition, its size in the width direction is approximately equal to that in the width direction of the rigid board 222 as shown in FIG. 9.

And as seen in FIG. 14, the top face 244 of the shielding case 224 has a recess 245 formed at the one end in the width direction on the hinge 24 side in the longitudinal direction (direction connecting the hinge 24 side and the microphone 216 side). Thus, the shielding case 224, when it is attached to the rigid board 222, does not overlap the first antenna 232 fixed to the rigid board 222 as shown in FIG. 9 in the thickness direction of the rigid board 222.

Further, as seen in FIG. 13, the shielding case 224, when it is attached to the rigid board 222, is arranged separately from the second antenna 234 attached to the end 222c of the rigid board 222 in the longitudinal direction of the rigid board 222. So the shielding case 224 and second antenna 234 do not overlap each other in the direction of the rigid board 222.

The shielding case 224 is made of hard synthetic resin and has a metallic layer formed on its entire surface by e.g. vapor deposition. So the shielding case 224 is made conductive in order to prevent outside noise from acting on the plural electronic components (not shown) formed on the first face 222a of the rigid board 222 and prevent electric fields generated around the electronic components (not shown) from acting on each other as noise.

For example, the shielding case 224 absorbs a change in the electric field generated from an RF (Radio Frequency) module (not shown) arranged on the first face 222a of the rigid board 222, thereby preventing the change in the electric field from acting on a base band chip (not shown) likewise arranged on the first face 222a of the rigid board 222 as noise.

Further, when the shielding case 224 is built in between the upper case 218 and the lower case 220, it is brought into contact with reference potential pattern 236 (see FIG. 9) formed on the first face 222a of the rigid board 222 so that the metallic layer on the surface thereof is placed at the potential equal to the reference potential pattern 236.

Further, as seen in FIG. 14, a cover 226 is arranged adjacently to the shielding case 224 so that it is embedded in the shape of the recess 245 of the top face 244 of the shielding case 224. The cover 226 has a top face 246 flush with the top face 244 of the shielding case 224.

Thus, the cover 226 is formed at a position overlapping the first antenna 232 on the rigid board 222 shown in FIG. 9 in the thickness direction of the rigid board 222. And the shielding case 224 and cover 226 are adapted so that their top faces 244, 246 form a continuous plane. The cover 226 is made of non-conductive hard synthetic resin, and unlike the shielding case 224, does not have the metallic layer on the surface.

Next, as seen in FIG. 8, a key FPC 228 is placed on the respective top faces 244, 246 of the shielding case 224 and cover 226. The key FPC 228 has a plurality of key switches 248 on the first face 228a on the upper case 218 side. The second face 228b thereof opposite to the first face 228a is placed in contact over both the respective top faces 244, 246 of the shielding case 224 and cover 226.

Figure 15:
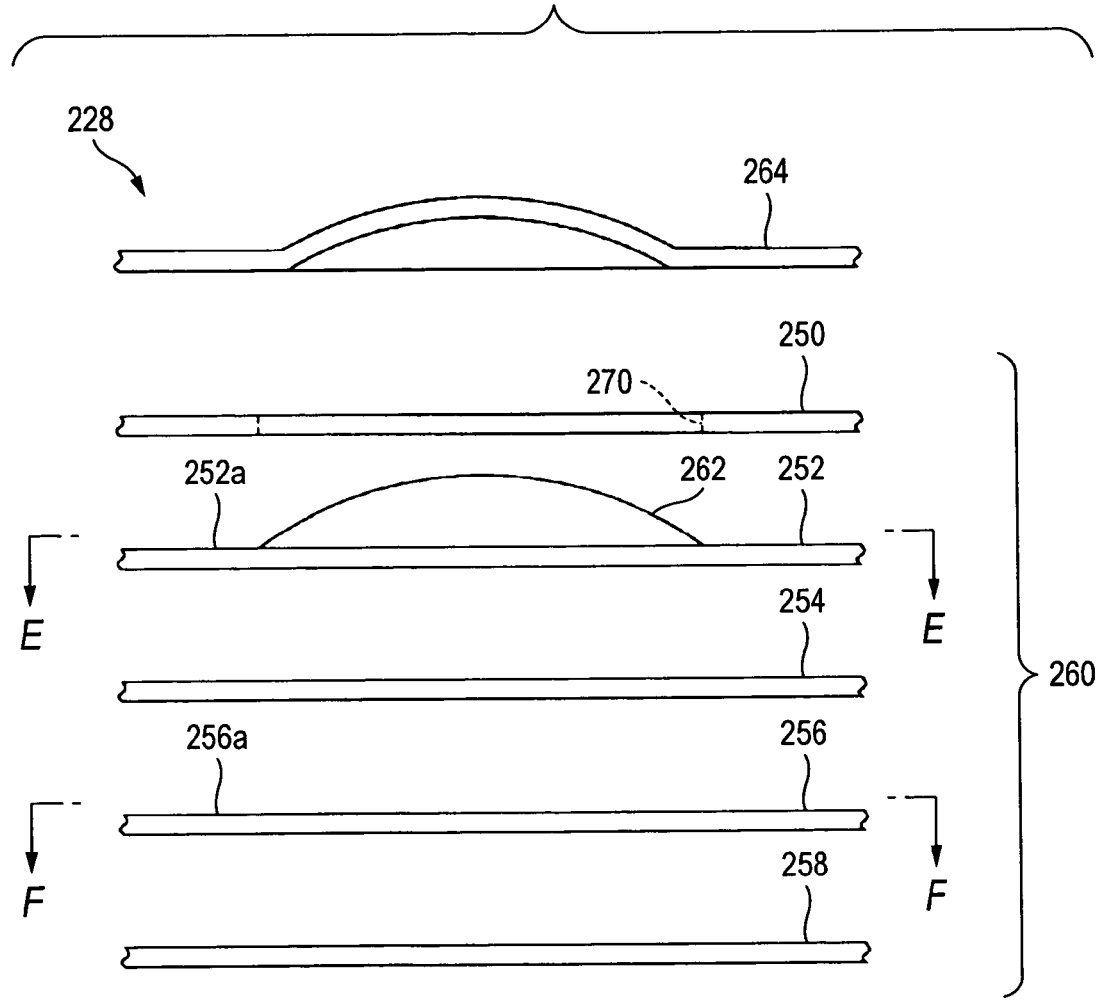
FIG. 15 is an exploded side view the state before interconnection of an insulating layer 250, a signal wire layer 252, an insulating layer 254, a ground layer 256, an insulating layer 258, a metallic dome 262 and a reflecting sheet 264, which are included in the key FPC 228 shown in FIG. 8.

The key FPC 228, as seen in FIG. 15, includes a multilayer structure flexible printed board 260 consisting of an insulating layer 250, a signal wire layer 252, an insulating layer 254, a ground layer 256 and an insulating layer 258 which are stacked successively and are similar in their outer shape in the plane direction; metallic domes 262 formed on the signal wire layer 252; and a reflecting sheet 264. The reflecting sheet 264 has flexibility and is overlaid on the insulating layer 250 of the flexible printed board 260.

The insulating layers 250, 254, 258 are a non-conductive sheet, respectively. The signal wire layer 252 is a sheet in which switch terminals 266, wiring patterns 276, etc. as described later are formed in a non-conductive film. The ground layer 256 is a sheet in which a reference potential pattern 272, wiring patterns 274, etc. are formed in a non-conductive film.

Figure 16:
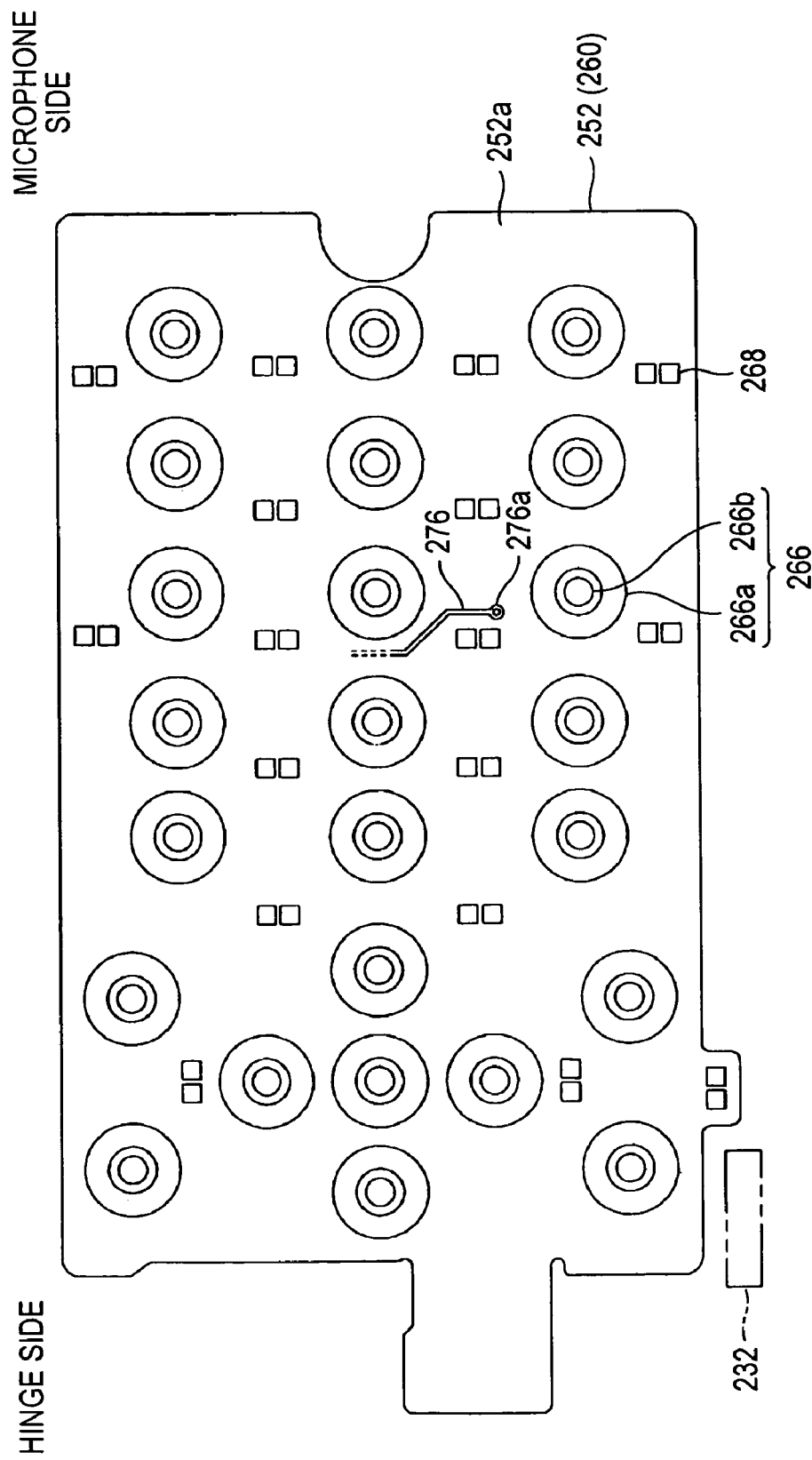
FIG. 16 is a plan view of the signal layer 252 taken in arrow E-E in FIG. 15.

On the face 252a on the insulating layer 250 side of the signal wire layer 252, as seen in FIG. 16, formed are a plurality of switch terminals 266 each consisting of an annular terminal 266a and a terminal 266b located centrally on the annular terminal 266a.

The metallic dome 262 shown in FIG. 15 is a metallic plate curved three-dimensionally to give an entire dome-like shape. The metallic dome 262 is overlaid on the switch terminal 266 of the signal wire layer 252 shown in FIG. 16. Thus, when the apex of the dome-like shape thereof is depressed, it is brought in contact with both terminals 266a and 266b of the switch terminal 266 to give electric conduction. The key switch 248 shown in FIG. 8 is configured from the metallic dome 262 and the switch terminal 266.

Further, as seen in FIG. 16, a plurality of LEDs 268 (light emitting diodes) are formed on the signal wire layer 252. In order to avoid complexity of the drawing, although only one is illustrated, a plurality of wiring patterns 274 are formed which are connected to the switch terminals 266 and LEDs 268 directly or through wiring patterns 276 described later, respectively. The switch terminals 266 and LEDs 268 are electrically connected to the rigid board 222, respectively though the wiring patterns 276 or electric wirings (not shown) connecting the key FPC 228 and the rigid board 222.

The metallic dome 262 arranged on the switch terminal 266 of the signal wire layer 252 is exposed toward the reflecting sheet 264 from a dome slot 270 of the insulating layer 250 which is formed so as to correspond to the position of the metallic dome 262 as shown in FIG. 15. Further, the metallic dome 262, when the reflecting sheet 264 is overlaid on the insulating layer 250, is covered with the reflecting sheet 264 so that it does not fall away.

Although not shown, on the insulating layer 250 and the reflecting sheet 264, slots are formed at the positions corresponding to the plurality of LEDs 268 (see FIG. 16) of the signal wire layer 252, respectively so that light emission from the LEDs is not cut off.

Figure 17:
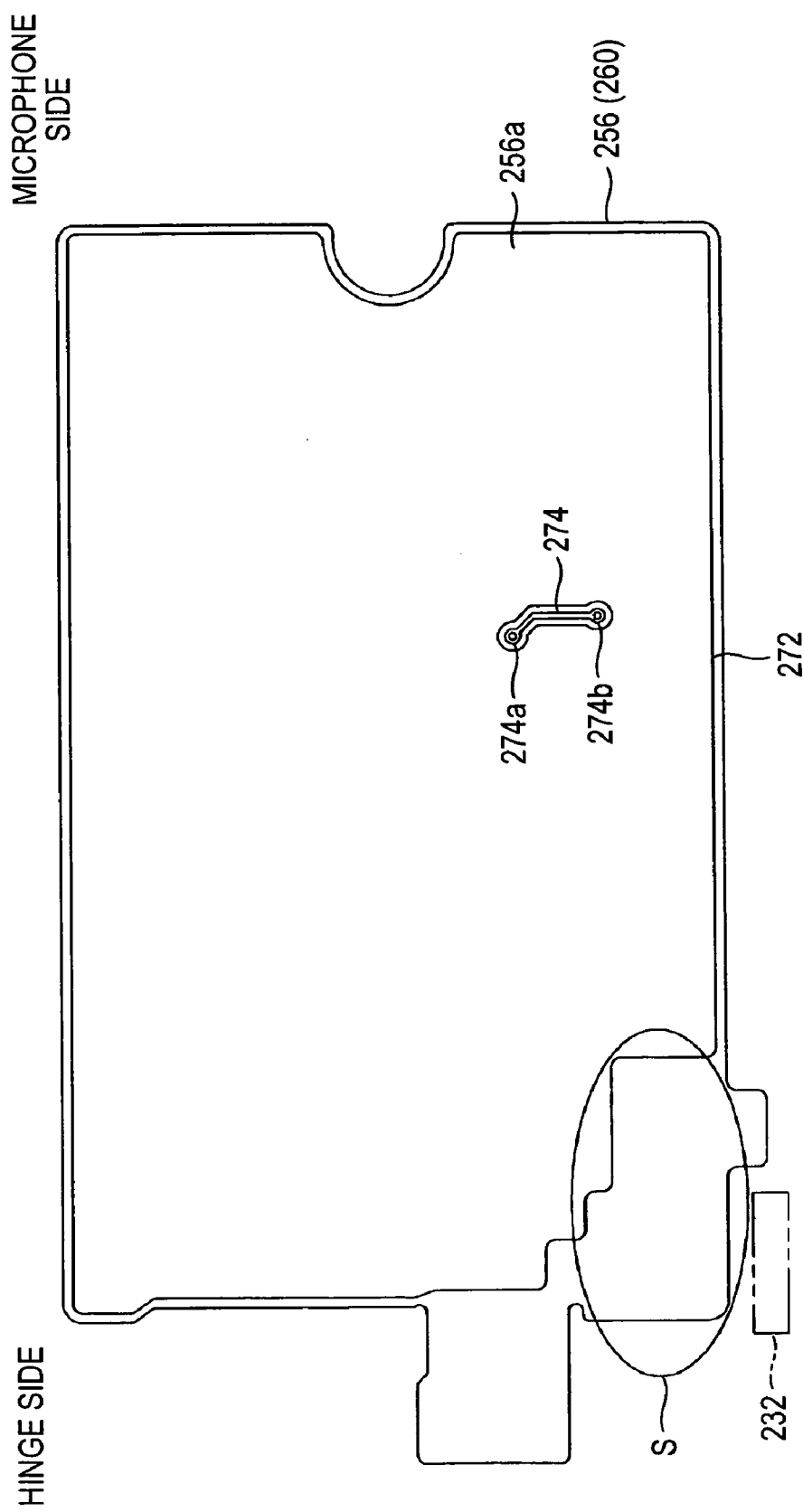
FIG. 17 is a plan view of the ground layer 256 taken in arrow F-F in FIG. 15.

On the face 256a on the insulating layer 254 side of the ground layer 256 in the flexible printed board 260 shown in FIG. 15, as seen in FIG. 17, a reference potential pattern 272 communicating with the reference potential is formed. The reference potential pattern 272 is overlaid on the greater part of the ground layer 256. But it is not overlaid on a region S at the one end in the width direction on the hinge 24 side in the longitudinal direction of the ground layer 256.

As seen in FIG. 8, when the key FPC 228 piled on the rigid board 222, shielding case 224 and cover 226 is housed within the second housing 28 (see FIG. 7), as seen in FIGS. 16 and 17, this key FPC 228 does not overlap the first antenna 232 of the rigid board 222 in the thickness direction of the rigid board 222. Now, a two-dot chain line graphic illustrated in FIGS. 16 and 17 is the first antenna 232, which represents a relative position thereof in the direction perpendicular to the thickness direction of the rigid board 222 for the signal wire layer 252 and ground layer 256. Further, the key FPC 228, as seen in FIG. 8, does not overlap the second antenna 234 also on the microphone 216 side in the thickness direction of the rigid board 222.

Thus, as seen in FIG. 16, the conductive area such as the switch terminals 266 and wiring patterns 276 of the signal wire layer 252 does not overlap the first antenna 232 of the rigid board 222 in the thickness direction of the rigid board 222. In addition, although not shown, the conductive area such as the switch terminals 266 and wiring patterns 276 of the signal layer 252 does not overlap the second antenna 234 on the microphone 216 side in the thickness direction of the rigid board 222.

And as seen in FIG. 17, the conductive area such as the reference potential pattern 272 and wiring patterns 274 of the ground layer 256 does not overlap the first antenna 232 of the rigid board 222 in the thickness direction of the rigid board 222. In addition, although not shown, the conductive area such as the reference potential pattern 272 and wiring patterns 274 of the ground layer 256 does not overlap the second antenna 234 also on the microphone 216 side in the thickness direction of the rigid board 222.

Further, as seen in FIG. 17, the reference potential pattern 272 of the ground layer 256 is not overlaid on the region S of the ground layer 256 (which overlaps the cover 226 when the key FPC 228 is placed over both the top faces 244, 246 of the shielding case 224 and cover 226). For this reason, this reference potential pattern 272 does not overlap the space of the electric field which greatly influences the first antenna 232, in the thickness direction of the rigid board 222.

Further, in order to avoid complexity of the drawing, although only one is illustrated in FIG. 17, a plurality of wiring patterns 274 serving as jumper wires are formed within the reference potential pattern 272 of the ground layer 256. The wiring patterns 274 are formed not to communicate with the reference potential pattern 272.

Both ends 274a, 274b of the wiring pattern 274 are communicated with the end 276a of the wiring pattern 276 and the end 266b of the switch terminal 266 of the signal wire layer 252 as shown in FIG. 16 via through-holes (not shown) made in the insulating layer 254 (FIG. 15) between the signal wire layer 252 and the ground layer 256.

Further, in FIG. 17, the other plurality of wiring patterns other than the wiring pattern 274 of the ground layer 256 also serve as jumper wires communicating, with one another, those other than the wiring pattern 276, the switch terminal 266 and LED 268 of the signal wire layer 252 illustrated in FIG. 16. Therefore, the plurality of wiring patterns of the signal wire layer 252 does not cross one another on the signal wire layer 252.

Next, as seen in FIG. 8, on the first face 228a of the key FPC 228, the key structure sheet 230 is overlaid. The key structure sheet 230 is configured from a silicon rubber sheet 278 and a plurality of key tops 280 (corresponding to keys) bonded thereon. The respective positions of the plurality of key tops 280 correspond to those of the key switches 248 of the key FPC 228. Thus, when the depressed face of the key top 280 is depressed by contact of a hand's finger, the rear face thereof depresses the corresponding key switch 248 also.

Figure 18:
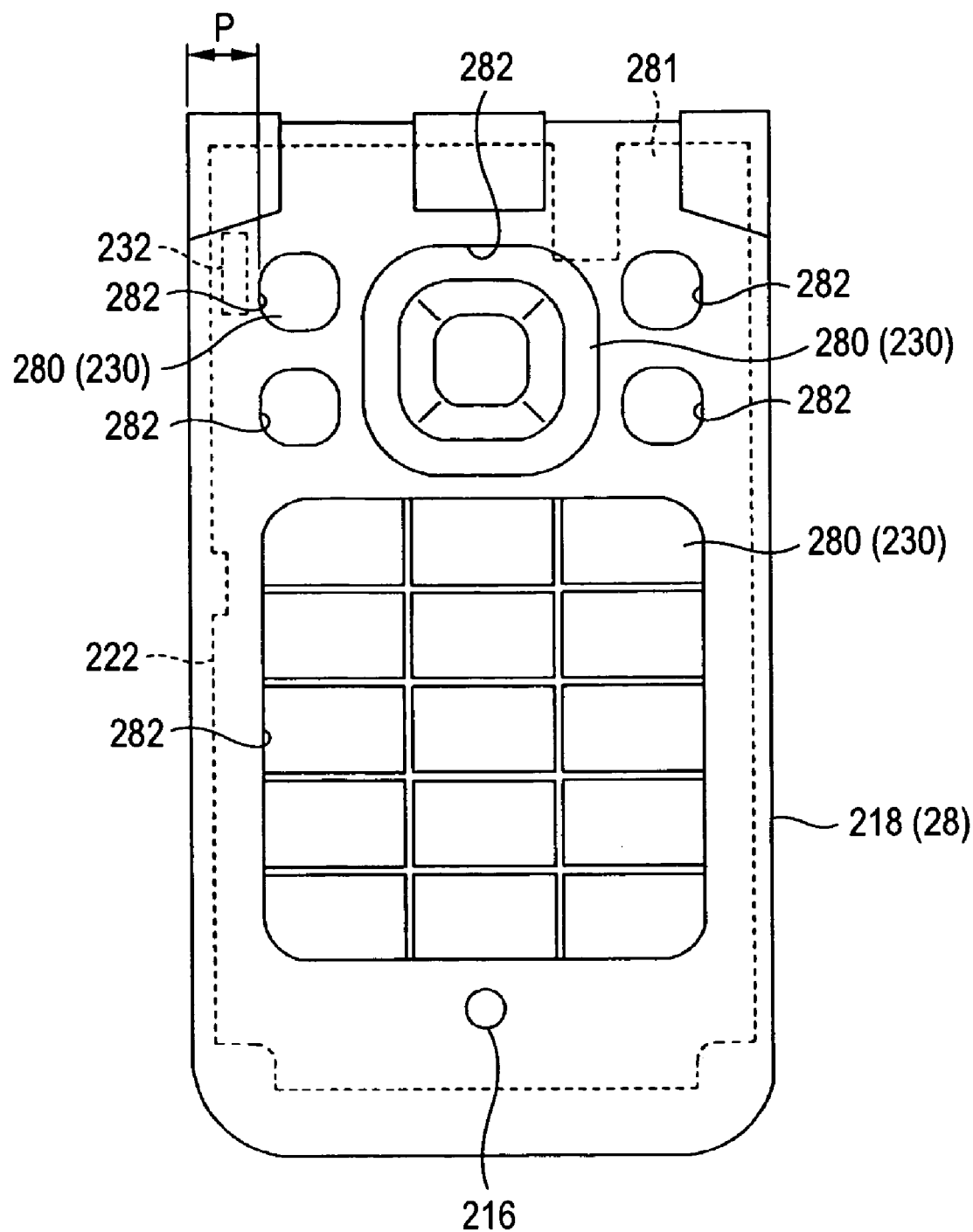
FIG. 18 is a plan view of the second housing 28 shown in FIG. 8.

Further, as seen in FIGS. 7 and 18, the upper case 218 of the second housing 28 has a plurality of key slots 282 formed on an operating plane 281 which is opposite to a displaying plane of the display unit 210 when the first housing 26 and the second housing 28 are folded toward each other. The respective key slots 282 are located at the positions where their shapes are not partially opened outside the outer shape of the operating plane 281. From each key slot 282, the depressed face for contact of the hand's finger of each the key tops 280 of the key structure sheet 230 is exposed outside.

As seen in FIG. 9, the first antenna 232 is located at the one end of the width direction (direction in parallel to the rotating shaft of the hinge 24) on the hinge 24 side of the longitudinal direction of the rigid board 222 (direction connecting the hinge side and the microphone side). Therefore, as seen in FIG. 18, any of the plurality of key slots 282 formed in the upper case 218 does not overlap the first antenna 232 on the rigid board 222 housed within the second housing 28 in the thickness direction of the rigid board 222.

In the folding cellular phone 22 according to this embodiment, the conductive area such as the switch terminals 266 and the wiring patterns 276 of the signal wire layer 252 in the key FPC 228 as shown in FIG. 16 and the conductive area such as the reference potential pattern 272 and the wiring patterns 274 in the ground layer 256 as shown in FIG. 17 are formed so as not to overlap the first antenna 232 in the thickness direction of the rigid board 222. This makes it possible to prevent the gain of the first antenna 232 from being deteriorated.

Further, as seen in FIG. 18, the respective key slots 282 are located at the positions where their shapes are not partially opened outside the outer shape of the operating plane 281. Thus, the respective key slots 282 provide a predetermined interval (for example, distance P in FIG. 18) on the end side in the width direction of the upper case 218. In addition, the first antenna 232 is arranged at the end of the width direction of the rigid board 222 so that it falls within this predetermined interval. Thus, the key switches 248 (see FIG. 8) arranged so as to overlap the positions of the key slots 282 in the plane direction of the operating plane 281 do not inevitably overlap the first antenna 232 in the thickness direction of the rigid board 222. This makes it possible to prevent the gain of the first antenna 232 from being deteriorated.

Further, as seen in FIG. 17, the reference potential pattern 272 of the ground layer 256 is formed not to overlay the region S of the ground layer 256 (region over the cover 246). So the reference potential pattern 272 does not overlap the space of the electric field which greatly influences the first antenna 232 in the thickness direction of the rigid board 222. This makes it possible to prevent the gain of the first antenna 232 from being deteriorated.

Further, as seen in FIGS. 9 and 10, the first antenna 232 is located at the one end in the width direction on the hinge 24 side in the longitudinal direction of the rigid board 222. In addition, the reference potential patterns 236, 238 are formed so as not to overlap the first antenna 232 in the thickness direction of the rigid board 222. This makes it possible to prevent the gain of the first antenna 232 from being deteriorated.

Further, as seen in FIG. 13, the shielding case 224 is located so as not to overlap the second antenna 234 in the thickness direction of the rigid board 222. This makes it possible to prevent the gain of the second antenna 234 from being deteriorated.

Incidentally, in this embodiment, as seen in FIG. 9, the first antenna 232 was located at the one end in the width direction (direction in parallel to the rotating shaft of the hinge 24) on the hinge 24 side in the longitudinal direction (direction connecting the hinge 24 side and the microphone 216 side) of the rigid board 222. However, the first antenna 232 may be located at a position not limited in the width direction of the end of the hinge 24 side or microphone 216 side in the longitudinal direction of the rigid board 222.

Further, the first antenna 232 may be located at a position not limited in the longitudinal direction of either one end in the width direction of the rigid board 222.

In such a case, it is needless to say that the reference potential patterns 236, 238 on the rigid board 222, shielding case 224 and the conductive areas of the signal wire layer 252 and ground layer 256 of the flexible printed board 260 are formed so as not to overlap the first antenna 232 in the thickness direction of the rigid board 222.

Further, in this embodiment, the outer shape of the flexible printed board 260, as seen in FIGS. 16 and 17, was formed so as not to overlap the first antenna 232 in the thickness direction of the rigid board 222. However, as long as the conductive areas such as the switch terminal 266 of the signal wire layer 252 and the reference potential pattern 272 of the ground layer 261 in the flexible printed board 260 do not overlap the first antenna 232, the outer shape of the flexible printed board 260 may be formed in its non-conductive area so as to overlap the first antenna 232.

Further, in the third embodiment, this invention was applied to the folding cellular phone 22. But it is needless to say that this invention can be applied to wireless communication terminal devices other than the folding cellular phone 22, such as a PHS (Personal Handy phone System), a PDA (Personal Digital Assistant) or a portable navigation device.

What is claimed is:

1. A wireless communication terminal device, comprising:
    a circuit board with a plurality of electronic components arranged thereon; and
    a conductive shielding case attached to the circuit board so that the shielding case covers the plurality of electronic components,
    wherein at least one of the electronic components is an antenna,
    a surface shape of the shielding case is formed in a shape not overlapping the antenna, and
    a non-conductive cover is provided at a position on the circuit board corresponding to an area overlapping the antenna in the surface shape of the shielding case.

2. The wireless communication terminal device according to claim 1,
    wherein the cover and the shielding case have roof surfaces nearly flush with each other.

3. The wireless communication terminal device according to claim 1,
wherein a key structure with a plurality of operable keys is arranged outside roof surfaces of the cover and the shielding case in their height direction.

4. The wireless communication terminal device according to claim 3,
wherein any one of the plurality of keys is oppositely arranged outside the roof surface of the cover in its height direction.

5. The wireless communication terminal device according to claim 1,
wherein the shielding case has a plurality of ribs or legs.

6. The wireless communication terminal device according to claim 5,
wherein the shielding case is a molded product of synthetic resin including the ribs, and surfaces extending over the ribs and the rib are plated.

7. The wireless communication terminal device according to claim 5,
wherein the roof surfaces of the shielding case is formed from a metallic plate member, and the ribs of the shielding case is formed from a synthetic resin member.

8. The wireless communication terminal device according to claim 5,
wherein the cover has a rib or a leg so that the cover enables to support depressing force applied on a roof surface of the cover when a key is operated.

9. The wireless communication terminal device according to claim 1,
wherein the cover and the shielding case have connection pieces connectable to each other, respectively.

10. The wireless communication terminal device according to claim 9,
wherein the connection pieces are formed to be connectable by a concave and a convex which are engageable with each other.

11. The wireless communication terminal device according to claim 9,
wherein the connection pieces are detachable from each other.

12. A wireless communication terminal device, comprising;
a first circuit board on which a first antenna and an electronic component are arranged;
a conductive shielding case formed on the first circuit board so as to cover the electronic component, and formed in a shape recessed in an area overlapping the first antenna and the first circuit board in a thickness direction thereof;
a non-conductive cover which adjoins the shielding case on the first circuit board, and is located at a position overlapping the first antenna in the thickness direction of the first circuit board;
a second circuit board which has a plurality of key switches and a conductive area electrically connecting the plurality of key switches to the first circuit board, and is placed on the shielding case and cover, wherein the conductive area is formed at a spot not overlapping the first antenna in the thickness direction of the first circuit board; and
a housing which incorporates the first circuit board, the shielding case, the cover, and the second circuit board.

13. The wireless communication terminal device according to claim 12, further comprising:
a key sheet which is overlaid on the second circuit board, and has a plurality of keys capable of depressing the plurality of key switches, respectively,
wherein the housing has a plurality of key slots from which each depressed face of the plurality of keys externally exposes, and
the first antenna is arranged at a position not overlapping the key slots in the thickness direction of the first circuit board at an end of a width direction and/or a longitudinal direction of the first circuit board.

14. The wireless communication terminal device according to claim 12,
wherein the second circuit board has a reference potential pattern to be supplied with a reference potential in the conductive area.

15. The wireless communication terminal device according to claim 12,
wherein the first circuit board has a reference potential pattern supplied with a reference potential for the first circuit board, and
the reference potential pattern is located at a position not overlapping the first antenna in the thickness direction of the first circuit board.

16. The wireless communication terminal device according to claim 15,
wherein the housing incorporates a second antenna supplied with power from the first circuit board, and
the reference potential pattern of the first circuit board is arranged at a position not overlapping the second antenna in the thickness direction of the first circuit board.

17. The wireless communication terminal device according to claim 16,
wherein the second antenna is at a position not overlapping the shielding case in the thickness direction of the first circuit board.

* * * * *